(12) United States Patent
Grounds et al.

(10) Patent No.: US 9,262,055 B2
(45) Date of Patent: Feb. 16, 2016

(54) HEAT MAP CAROUSEL FOR DISPLAYING HEALTH AND STATUS INFORMATION FOR AN ELECTRO-MECHANICAL SYSTEM

(71) Applicant: Raytheon Company, Waltham, MA (US)

(72) Inventors: Christopher Bradley Grounds, Huntsville, AL (US); Vanessa Maria Battaglia, Hudson, MA (US); Daniel Thomas Donohoo, Athens, AL (US)

(73) Assignee: Raytheon Company, Waltham, MA (US)

( * ) Notice: Subject to any disclaimer, the term of this patent is extended or adjusted under 35 U.S.C. 154(b) by 227 days.

(21) Appl. No.: 13/970,150

(22) Filed: Aug. 19, 2013

(65) Prior Publication Data

US 2015/0052485 A1   Feb. 19, 2015

(51) Int. Cl.
G06F 3/0482 (2013.01)
H04L 12/24 (2006.01)

(52) U.S. Cl.
CPC .............. *G06F 3/0482* (2013.01); *H04L 41/22* (2013.01)

(58) Field of Classification Search
CPC .............................. G06F 3/0482; H04L 41/22
USPC ................................................. 715/736, 738
See application file for complete search history.

(56) References Cited

U.S. PATENT DOCUMENTS

| 6,774,786 B1 * | 8/2004 | Havekost et al. ............. 340/517 |
|---|---|---|
| 6,819,344 B2 * | 11/2004 | Robbins ................. G06T 11/206 345/441 |
| 7,698,335 B1 | 4/2010 | Vronay |
| 7,737,995 B2 | 6/2010 | Vronay et al. |
| 7,761,812 B2 | 7/2010 | Ostojic et al. |
| 7,818,688 B2 | 10/2010 | Narita et al. |
| 7,856,370 B2 | 12/2010 | Katta et al. |
| 8,028,250 B2 | 9/2011 | Vronay et al. |
| 8,145,518 B2 | 3/2012 | Cao et al. |
| 8,285,414 B2 | 10/2012 | Ahroni et al. |
| 8,346,935 B2 | 1/2013 | Mayo et al. |
| 8,347,230 B2 | 1/2013 | Decker et al. |
| 8,395,624 B2 | 3/2013 | Souza |
| 8,429,555 B2 | 4/2013 | Cho et al. |
| 2007/0282941 A1 * | 12/2007 | Takakura ........... G06F 17/30274 709/202 |
| 2008/0208820 A1 * | 8/2008 | Usey .................. G06F 17/30616 |
| 2009/0172598 A1 * | 7/2009 | Yamanaka ............ G06F 3/0482 715/841 |
| 2010/0249976 A1 * | 9/2010 | Aharoni et al. ................ 700/110 |
| 2011/0087988 A1 * | 4/2011 | Ray et al. ....................... 715/771 |
| 2011/0183732 A1 * | 7/2011 | Block ..................... G06Q 30/02 463/1 |
| 2012/0078426 A1 * | 3/2012 | Macey ........................... 700/286 |
| 2013/0103218 A1 * | 4/2013 | Das et al. ....................... 700/291 |
| 2013/0311634 A1 * | 11/2013 | Raymond et al. ............. 709/223 |
| 2013/0328931 A1 * | 12/2013 | Wolcott .................. G06T 11/60 345/633 |

* cited by examiner

*Primary Examiner* — Andrew Tank
*Assistant Examiner* — Nicholas Klicos
(74) *Attorney, Agent, or Firm* — Eric A. Gifford

(57) ABSTRACT

A heat map carousel displays health and status information for an electro-mechanical system using a set of heat maps rendered in a carousel view. The set includes a plurality of sub-systems, each sub-system including one or more instances of hardware components from different categories or sub-categories. A heat map is more prominently displayed as a focus heat map. Health and status information for different instances of hardware components is organized within a heat map either by category/sub-category and instance or by location. Attribute values are mapped to a color indicative of health and status of the instance. In response to an operator input, the carousel is rotated to display a different heat map as the focus heat map. In response to operator selection of a cell in the focus heat map, health and status information for that cell is displayed.

15 Claims, 11 Drawing Sheets

HEAT MAP CAROUSEL FOR DISPLAYING HEALTH AND STATUS INFORMATION FOR AN ELECTRO-MECHANICAL SYSTEM

BACKGROUND OF THE INVENTION

1. Field of the Invention

This invention relates to the display of health and status information for complex electro-mechanical systems, and more particularly to the use of heat maps in a carousel to display health and status information.

2. Description of the Related Art

Complex electro-mechanical systems are common across a wide range of industries e.g. aircraft or car manufacturers, chemical processing plants, oil refineries, semiconductor fabrication etc. and products e.g. aircraft, ships, vehicles, weapon systems, surveillance systems etc. Each of these systems include many hardware components from different categories and sub-categories of components and multiple instances of each component. The individual component instances are typically grouped into sub-systems and possibly sub-sub-systems. An instance may belong to multiple sub-sub-systems and sub-systems.

To ensure that the system functions properly and receives maintenance as required, it is important to monitor the health and status of the system. In many instances, the health and status information is monitored by an operator, and thus must be displayed in a manner that is comprehensive and useful to the operator. Typically, each instance of a hardware component has one or more attributes, and values assigned to those attributes, that indicate the current health and status of the component. These values may be numerical 0/0.5/1 or states such as bad/degraded/good.

There are three common display methods currently used for health and status information within the industry. First, a system is organized into a decomposable hierarchy of sub-systems, which allows progressive disclosure of detailed sub-system status. The overall system status is notionally portrayed as a top-level label or icon on the desktop. The icon or label is color-coded and allows the operator to open a sub-window that displays status at the sub-system level. Increasing levels of detail can be presented to the operator by providing access to additional sub-windows. This has a tendency to create several successive sub-sub-windows and can clutter a display.

The second display method consolidates sub-windows and sub-sub-windows by providing navigation through the decomposable hierarchy as an expandable/contractible tree. An example of this type of display is a health and status tree that starts at the system level and has major sub-nodes (branches) for the primary sub-systems. Each sub-node allows the operator to progressively expand the tree branch to lower and lower levels. In the tree, "worst case" status is usually rolled up from the bottom to the top, i.e., an off-nominal component will cause the status for that component to be color-coded negatively, which then color-codes the sub-system for which that component is part of, up to the system level having an off-nominal condition. This creates a searching problem requiring several tree branch "expansions" to find the root cause component when there are several sub-systems as part of an overall system.

Lastly, to help the operator understand the significance and location of the health and status, a geospatial/graphical representation is sometimes used to physically place status icons on a representation of the system. Geo-registering helps provide a physical location cue for each subsystem. Geo-registering can also be used for presenting status information for smaller display devices. A limitation of this method is that at a system-level, this could imply hundreds of status icons on the physical system map. To mitigate this problem, a system can be broken up into geospatial "sub-maps" representing primary sub-systems where the number of status icons would be reduced.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention displays health and status information for an electro-mechanical system using a set of heat maps rendered in a carousel view. The set includes a plurality of sub-systems, each sub-system including one or more instances of hardware components from different categories or sub-categories. A heat map is more prominently displayed as a focus heat map. Health and status information for different instances of hardware components is organized within a heat map either by category/sub-category and instance or by location. Attribute values are mapped to a color indicative of health and status of the instance. In response to an operator input, the carousel is rotated to display a different heat map as the focus heat map. In response to operator selection of a cell in the focus heat map, health and status information for that cell is displayed.

In an embodiment, each instance includes one or more identifiers e.g. category, sub-category, instance, location, sub-system membership(s) etc. One or more filters may be applied to the instances to define the sub-systems and to group the sub-systems into a set. One or more filters may be applied to the instances to further define what categories/sub-categories of the individual sub-systems to render in the heat maps.

In an embodiment, if no instance is mapped to a cell in the heat map or if an instance mapped to a cell does not have an attribute value, a default color (e.g. grey) is mapped to that cell to denote no value for that cell.

In an embodiment, the heat maps for the different sub-systems are linked in an ordered list. The ordered list may be a strip or a continuous ring.

In an embodiment, the focus heat map is centrally displayed in the carousel display panel and more prominently displayed than any other displayed heat maps. In an embodiment, the heat maps on either side of the focus heat map in the ordered list are displayed to either side of the focus heat map. In another embodiment, all of the heat maps in the ordered list are displayed in a three-dimensional perspective view. In an embodiment adapted for a hand-held display, the heat maps on either side of the focus heat map in the ordered list are displayed as single-column borders to either side of the focus heat map. The worst-case health and status is rolled up across the row of the heat map to determine the color of the single-column border.

In an embodiment, in response to operator selection of a cell in the focus heat map, the displayed health and status information includes at least an instance label for that cell and the attribute that determined the displayed health and status for the cell. The displayed information may also include one or more links to raw data for the one or more attribute values, a historical record of the one or more attribute values, and links to applicable diagnostics or service manuals.

In an embodiment, an inset view of the system is displayed adjacent the carousel display panel. The inset view includes either a spatial or functional layout of the sub-systems. The sub-system in the insert view that corresponds to the focus heat map is highlighted. As the operator rotates the carousel to change the focus heat map, the highlighted sub-system changes accordingly. Each sub-system may be color-coded with the worst-case status in the corresponding heat map.

In an embodiment, the system includes a hierarchy of at least two levels in which the set is a first level and at least one sub-system constitutes a set at a second level that itself includes a plurality of sub-systems with each sub-system assigned a heat map with the heat maps linked in an ordered list. The operator selects the set at the first or second level to display at least one of the heat maps in the ordered list at the first or second level in the carousel display panel as the focus heat map. The operator may elect to display the sets of heat maps at different levels in the hierarchy.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
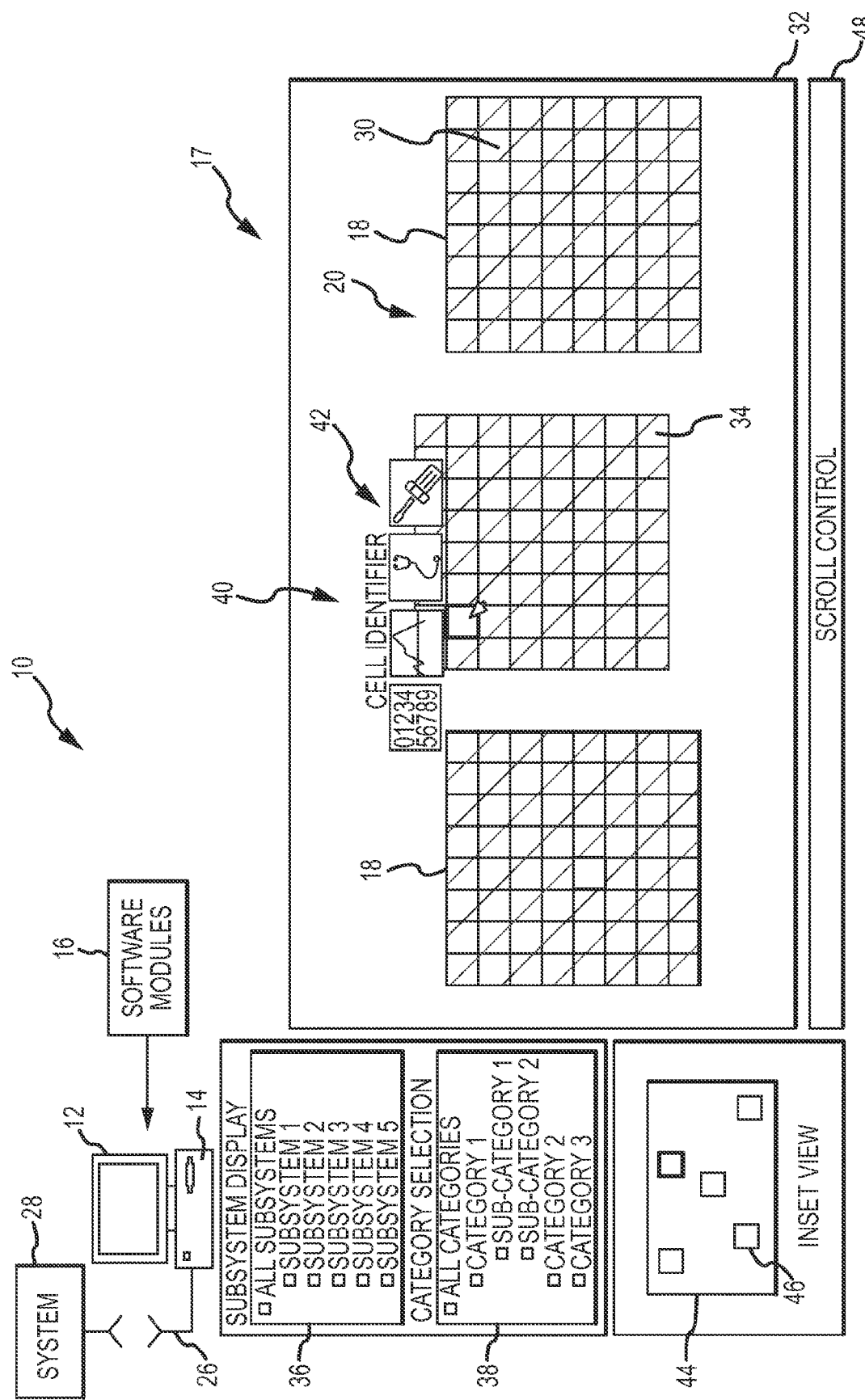
FIG. 1 is a diagram of an embodiment of a heat map carousel for displaying health and status information.

The present invention displays health and status information for an electro-mechanical system using a set of heat maps rendered in a carousel view. The set includes a plurality of sub-systems, each sub-system including one or more instances of hardware components from different categories or sub-categories. A heat map is more prominently displayed as a focus heat map. Health and status information for different instances of hardware components is organized within a heat map either by category/sub-category and instance or by location. Attribute values are mapped to a color indicative of health and status of the instance. In response to an operator input, the carousel is rotated to display a different heat map as the focus heat map. In response to operator selection of a cell in the focus heat map, health and status information for that cell is displayed.

Complex electro-mechanical systems are common across a wide range of industries e.g. aircraft or car manufacturers, chemical processing plants, oil refineries, semiconductor fabrication etc. and products e.g. aircraft, ships, vehicles, weapon systems, surveillance systems etc. Each of these systems include many hardware components from different categories and sub-categories of components and multiple instances of each component. The individual component instances are typically grouped into sub-systems and possibly sub-sub-systems. An instance may belong to multiple sub-sub-systems and sub-systems. Metadata for each instance includes identifiers of the category, sub-category, location (absolute, within a system or within a sub-system) and sub-system membership information. Each instance of a hardware component has one or more attributes, and values assigned to those attributes, that indicate the current health and status of the component.

As used herein, a "heat map" is a graphical representation of attribute values in a two-dimensional array where instances are mapped to cells in the array and the attribute values are mapped to and displayed as a color. In a categorical heat map, a first dimension may be the category/sub-category and a second dimensional may be the instance. An instance is mapped to a cell based on its category/sub-category and instance metadata. In a spatial heat map, the first and second dimensions define a physical area in the system. An instance is mapped to a cell based on its location metadata.

As used herein, a "carousel" is an ordered list (e.g. a strip or continuous ring) of images that can be rotated to display a different one of the images as a focus image. Other images in the ordered list may be displayed with the focus image. For example, images may be displayed to either side of the focus image or all of the images may be displayed in a three-dimensional carousel view.

The invention uses a "carousel" to display an ordered list of "heat maps" for different sub-systems in an electro-mechanical system. This "heat map carousel" provides a comprehensive and useful graphical interface for communicating health and status information to an operator. The "heat map carousel" may incorporate filtering capability to define the sub-systems and set of sub-systems and to define what components of those sub-systems to render in the heat map, an inset view of the sub-systems to provide a visual cue for the focus heat map, a "mouse over" capability that reveals health and status information of individual cells in the heat map or a hierarchy of heat maps for different sub-system configurations.

Figure 2:
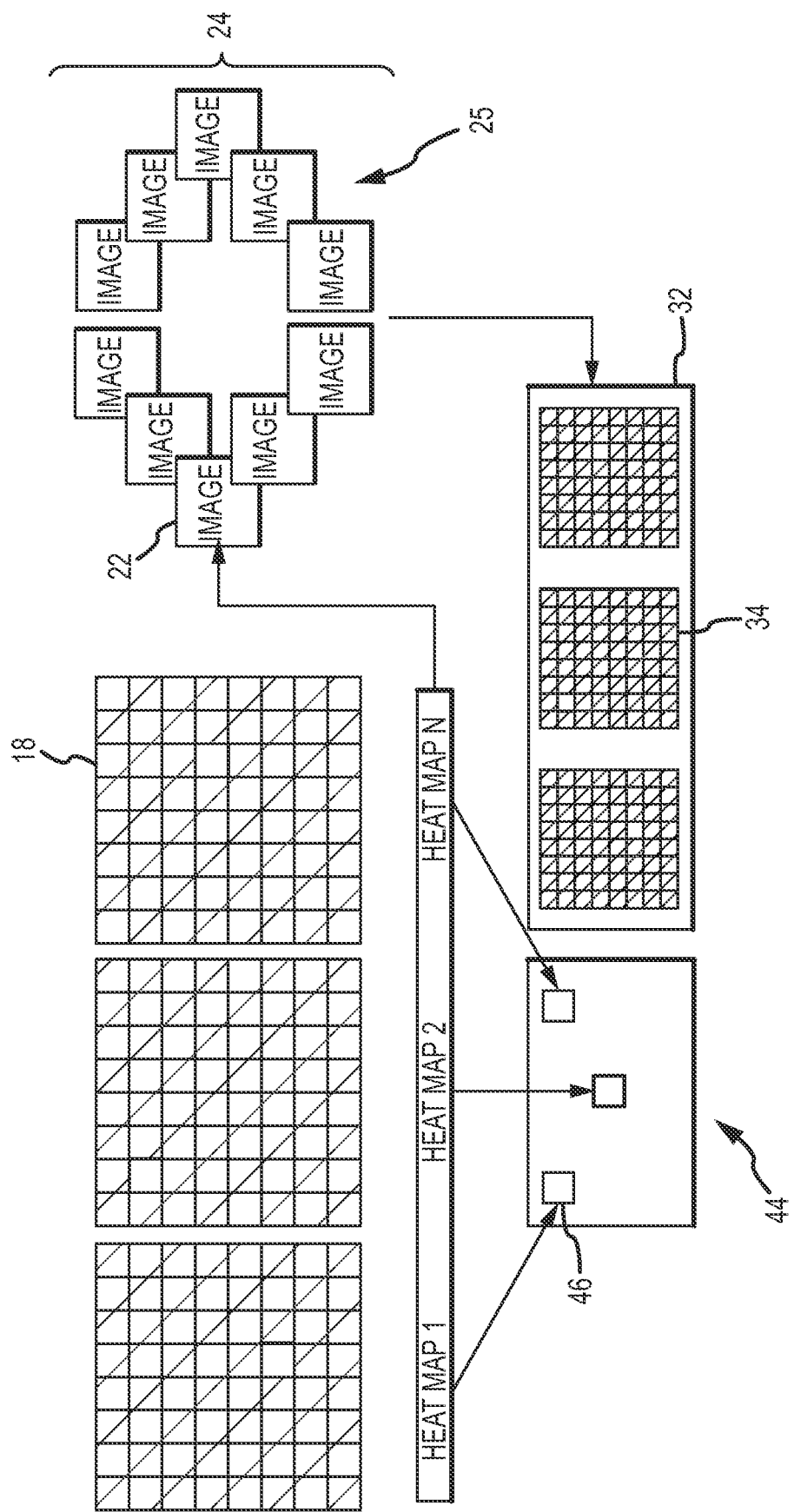
FIG. 2 is a diagram illustrating the mapping of the different sub-systems in the inset view to the individual heat maps to the different bins in a carousel data structure.

Referring now to FIGS. 1 and 2, an embodiment of a health and status display system 10 includes a display 12, computing resources 14 including processing units and memory units and one or more software modules 16 for processing health and status information to render a graphical interface 17 that displays health and status information for different sub-systems of a system as one or more heat maps 18 in a carousel view 20 on the display. Each heat map 18 is assigned to a different bin 22 in a carousel data structure 24 in which the bins, hence heat maps, are linked in an ordered list 25 (e.g. a strip or continuous ring). Display system 10 includes a communication link 26 to an electro-mechanical system 28 to poll the system and receive updated health and status information for the different subs-systems e.g., attribute values for each of the instances in the different sub-systems. The system may be polled periodically at a set time interval and/or asynchronously upon the occurrence of specific events. The attribute values, hence heat maps are updated regardless of whether the heat map is currently displayed.

Graphical interface 17 displays health and status information for different sub-systems of a system as one or more heat maps 18 in carousel view 20. The health and status information for each sub-system in a set is mapped to a different heat map. Each heat map is a two-dimensional array of cells 30. The component instances in a sub-system are mapped to different cells 30 in the two-dimensional array. For a "categorical" heat map, the instances are mapped according to their category/sub-category and instance identifiers. For a "spatial heat map", the instances are mapped according to their location identifier. If the resolution of the spatial heat map is coarser than the density of hardware components, multiple instances of the same or different category/sub-category components may be mapped to the same cell. The format of the heat map, categorical or spatial, and the resolution of the array may be determined by the software modules or operator selection. The software module may select a default format and resolution, which the operator may override. The sets and sub-systems are suitably defined so that the resolution of the heat maps is manageable e.g. between 5×5 and 10×10.

It is generally desirable that the heat maps are uniform across the different sub-systems in a set. For example, a categorical heat map would have the same categories/sub-categories and maximum number of instances for all sub-systems. If a given sub-system does not include instances of a category/sub-category that row is simply not used rather than being deleted. For example, a spatial heat map would have the same dimensions and would cover the same physical area for each sub-system albeit in a different location. Uniformity of heat map presentation for a given carousel assists operator comprehension.

The attribute values for the instances are mapped to a color to color the cells of the heat map. Each color is indicative of a different state (good/fair/poor, pass/fail, full/partially full/empty etc.) of the health and status of the instance. The color assigned to a particular cell represents the "worst case" state if there is more than one attribute for a given instance or, as may be the case for a spatial heat map, if there is more than one instance mapped to a given cell. In different embodiments, either discrete or continuous attribute values may be mapped to a limited set of colors e.g. red, yellow and green or may be mapped 1-to-1 to a full set of discrete or continuous colors. If a cell has no data, either because no instance maps to that cell or the mapped instances have no attribute values, a default color such as grey may be mapped to that cell to denote no value for that cell.

At least one of the heat maps 18 is displayed in the carousel view 20 within a carousel display panel 32. One of those heat maps 18 is displayed as a focus heat map 34 that is more prominently displayed (e.g. centrally displayed, larger, offset, highlighted etc.) than the other heat maps 18. In an embodiment, the heat maps 18 on either side of the focus heat map in ordered list are displayed to either side of the focus heat map 34. In another embodiment, all of the heat maps in the ordered list are displayed in a three-dimensional perspective view. In another embodiment, multiple carousel views 20 are displayed simultaneously e.g. one on top of the other. The different views may correspond to different sets in a hierarchy. In an embodiment adapted for a hand-held display, the heat maps on either side of the focus heat map in the ordered list are displayed as single-column borders to either side of the focus heat map. The worst-case health and status is rolled up across the row of the heat map to determine the color of the single-column border.

Each instance includes one or more identifiers e.g. category, sub-category, instance, location, sub-system membership(s) etc. ("metadata"). Graphical interface 17 may include operator selectable filters 36 for defining the sub-systems and the set(s) of sub-systems for display in the heat map carousel. Different filters 36 will define and group sub-systems into different groups. For example, one filter could be electronics sub-systems that would define and select various electronics as sub-systems and group them together. Other sets could be "fuel", "power", "storage", a temporal history of sub-system etc. The filter may create sub-systems by location within the system or by a functional sub-unit. Another set of operator selectable filters 38 may define what categories/sub-categories are included in the sub-systems for purposes of rendering the heat maps. Consider the electronics set, one or more filters could be applied so that only "storage" components are included in the heat map. The different filters provide an operator great flexibility to configure the sets and sub-systems as desired to view health and status information.

Graphical interface 17 allows an operator to select a cell 30 in the focus heat map 34 by "mousing over" the cell, clicking on the cell or otherwise selecting the cell. In response, the graphical interface displays health and status information 40 for that cell. That information will typically include at least an instance label (e.g. power supply 5) for that cell and the attribute that determined the displayed health and status for the cell. The displayed information may also include one or more links 42 to raw data for the one or more attribute values, a historical record of the one or more attribute values, and links to applicable diagnostics or service manuals. This "mouse over" capability allows an operator to quickly identify a particular instance of a hardware component and the attribute whose health or status is degraded.

Graphical interface 17 may also include an inset view 44 displayed adjacent the carousel display panel 32. The inset view 44 includes an icon 46 for each sub-system arranged in either a spatial or functional layout of the sub-systems. For a spatial layout the icons 46 may be generic, distinguished only by their location within the system and may be overlaid on an icon of the system itself for context. For a functional layout, the icons 46 are configured by shape or with a label to indicate the function of each sub-system. The icons may be color-coded (e.g. border or entire icon) with the color corresponding to the worst-case status in the heat map of the associated sub-system. The icon 46 in the insert view that corresponds to the focus heat map is highlighted. As the operator rotates the carousel to change the focus heat map, the highlighted icon 46 changes accordingly.

The system may include a hierarchy of at least two levels in which the set is a first level and at least one sub-system constitutes a set at a second level that itself includes a plurality of sub-systems with each sub-system assigned a heat map with the heat maps linked in an ordered list. The operator selects the set at the first or second level to display at least one of the heat maps in the ordered list at the first or second level in the carousel display panel as the focus heat map. The operator may elect to display both sets of heat maps at different levels in the hierarchy.

In an embodiment, display system 10 and specifically software modules 16 are configured to display health and status information for a particular electro-mechanical system 28. Each instance is provided with metadata defining the different identifiers of category, sub-category, instance, location, different sub-system and set memberships and with one or more health and status attributes.

An operator selects filters 36 and 38 to define a set including a plurality of sub-systems, each sub-system including one or more instances of hardware components from one or more categories and sub-categories. Display system 10 polls the system 28 for health and status information to update the attribute values for each instance of each sub-system in the set.

Display system 10 and/or the operator define a two-dimensional heat map 18 having rows and columns of cells 30. The heat map may be a categorical heat map or a spatial heat map. The display system may select a certain format based on the set or sub-system definitions. The operator may override the selected format or may toggle back-and-forth. The number of rows and columns and their definition in the heat map is preferably uniform across the set e.g., the heat map for sub-system 1 has the same layout as the heat map for sub-system 2 and so forth.

For each sub-system in the set, the display system 10 maps the one or more instances of hardware components from the one or more categories and sub-categories to different cells 30 in the heat map 18 and maps the attribute values for the one or more instances to a color to color the cells of the heat map and provide a different heat map 18 for each sub-system. Each color is indicative of a different state of the health and status of an instance. Any cells that do not map to an instance or do not have attribute values for a mapped instance are suitably mapped to a default color (e.g. gray) to denote no data. The display system assigns each heat map 18 to a different bin 22 in carousel data structure 24 with the bins and heat maps being linked in ordered list 25.

The display system 10 displays at least one of the heat maps 18 in the ordered list 25 in carousel display panel 32 on the display 12. One of the heat maps 18 is displayed as the focus heat map 34. In this example, focus heat map 34 is centrally displayed between adjacent sub-system heat maps 18 to either side. The focus heat map 34 is offset slightly to more prominently display it with respect to the other heat maps 18. The focus heat map 34 may be more prominently displayed by offsetting, sizing, highlighting etc. with respect to the other maps.

The display system 10 displays an inset view 44 of the system adjacent the carousel display panel 32. The inset view 44 displays an icon 46 for each sub-system arranged in either a spatial or functional layout of the sub-systems. The icon 46 corresponding to the focus heat map 34 is highlighted. The display system may highlight each icon 46 with the color connoting the worst-case status in the corresponding heat map and sub-system.

In response to an operator input, the display system 10 rotates the ordered list 25 to display a different heat map 18 as the focus heat map 34 in the carousel display panel 32. The operator may rotate the carousel in any number of ways including but not limited to swiping the operator's finger left or right across the carousel view 20, using a scroll bar 48, clicking on an icon 46 in inset view 44 or selecting an adjacent heat map 18. If the ordered list is a strip, an operator can scroll to either end, and then must reverse course. If the ordered list a continuous ring, an operator can continuously scroll in any direction.

In response to an operator selection of a cell 30 in the focus heat map 34, the display system 10 displays health and status information 40 for the selected cell. This information typically includes at least the label of the instance mapped to that cell (e.g. RAM 3) and the attribute(s) that mapped to the cell color. The information may also include links 42 to other more detailed information.

Figure 3:
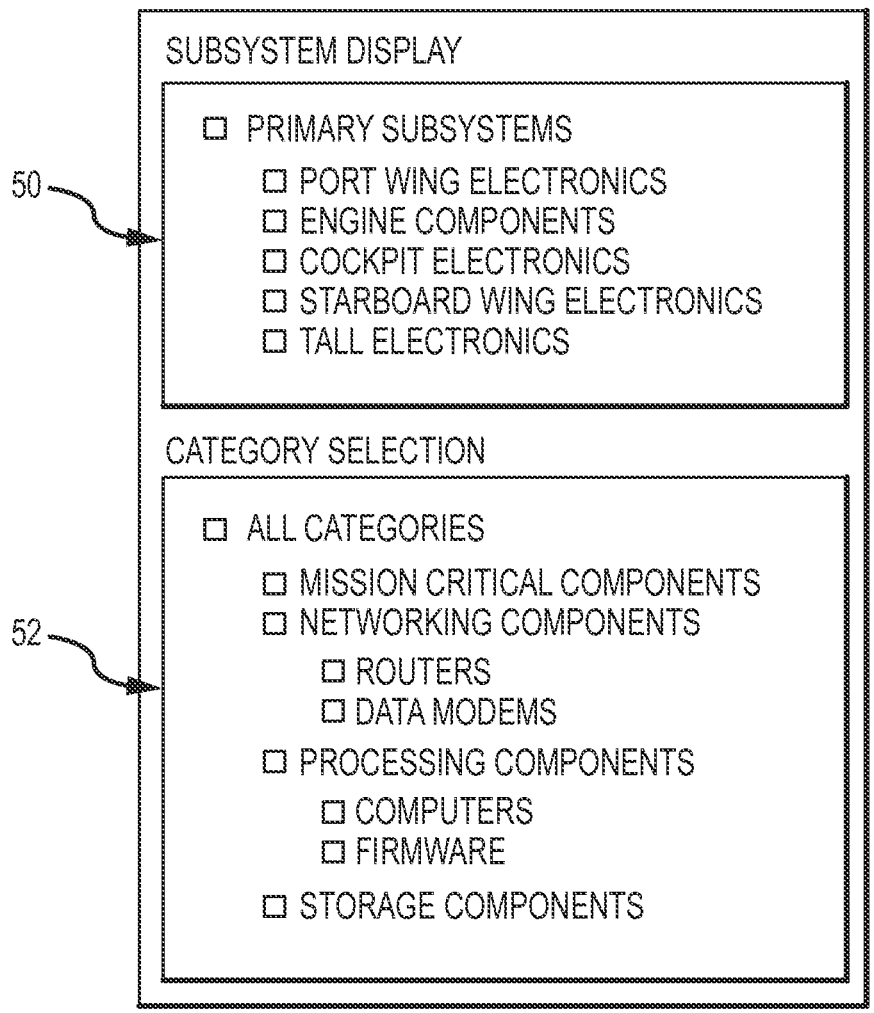
FIG. 3 is a diagram of an embodiment of various filter options for constructing the set of heat maps to load into the carousel.

Referring now to FIG. 3, an embodiment of the display system and graphical interface includes user selectable filters 50 and 52 for defining individual sub-systems and a set of sub-systems and for defining the components in the sub-systems to be rendered in the heat maps. In this example, filter 50 defines a set of primary subsystems and allows the operator to select all or to select specific electronics sub-systems. If "port wing electronics" are selected, all component instances with an identifier for port wing electronics are provisionally included in that sub-system, and similarly with the other sub-systems. Filter 52 lists the various categories and sub-categories of components that may be present in the different sub-systems and allows the operator to select all or to select specific categories or sub-categories. For example, if the operator selects "Networking Components", only those component instances that were provisionally included that have a category identifier for "networking components" are included in the final set. If an operator selected all of the "primary subsystems" and "networking components", the display system would create five heat maps, one for each sub-system, and each heat map would include only instances (and their attribute values) for Networking Components. The operator could view the color-coded health and status information for only the Networking Components in each electronics sub-system by rotating through the carousel. The operator could deselect "networking components" and select "processing components" to render five heat maps for Processing Components.

This is but one simple example for defining sub-systems and grouping them into a set and for defining which components of those sub-systems will be rendered into heat maps for display in the carousel. The graphical interface may contain an extensive library of filters for defining sub-systems and grouping them into sets and for filtering the sub-systems for rendering as heat maps. This library may include standard filters or filters specifically configured by the operator for a particular electro-mechanical system.

As previously described, each instance of a hardware component will have one or more attributes associated with the health and status of that type of component. The value of that attribute is indicative of the state of the health and status of the particular instance of the hardware component. The type of attributes varies widely with the type of hardware component.

A "Networking Component" such as a router or data modem may include attributes such as a unique name (e.g. Router 1A) and a model number (e.g. Cisco 1941) and health and status attributes such as data packet loss and data latency that map to good/degraded/bad states. For example, if data packet loss is less than x % good, if more than x % but less than y % degraded and if more than y % bad. If data latency is less than x milliseconds, good, if more than x milliseconds but less than y milliseconds degraded, and if more than y milliseconds, bad. The good/degraded/bad states may, for example, map to green, yellow and red colors in the heat map. In this manner, the health and status states for widely differing hardware components with different attributes can be mapped within one heat map using a standard color convention.

A "Processing Component" such as a CPU might include a unique name (e.g. Flight Computer 1) and model number (e.g. Dell XPS 132) and health and status attributes such as CPU utilization and CPU operability that map to good/degraded/bad and good/bad, respectively. For example, if CPU utilization is less than x % busy good, if greater than x % busy but less than y % degraded and if greater than y % bad. For CPU operability, the component either works (good), or doesn't (bad).

A "Storage Component" such as RAM might include a unique name (e.g. DRAM Slot 1) and model number or amount of memory (e.g., 1 GB) and health and status attributes such as Free Memory or Memory Swap (between disk cache and RAM). If the amount of Free Memory is more than x % good, if less than x % but more than y % degraded and if less than y % bad. A Disk Drive might include a unique name (e.g., Disk Drive 1A) and model number or amount of storage (e.g., 80 GB) and health and status attributes such as free storage or stored data access/return rate.

Figure 4:
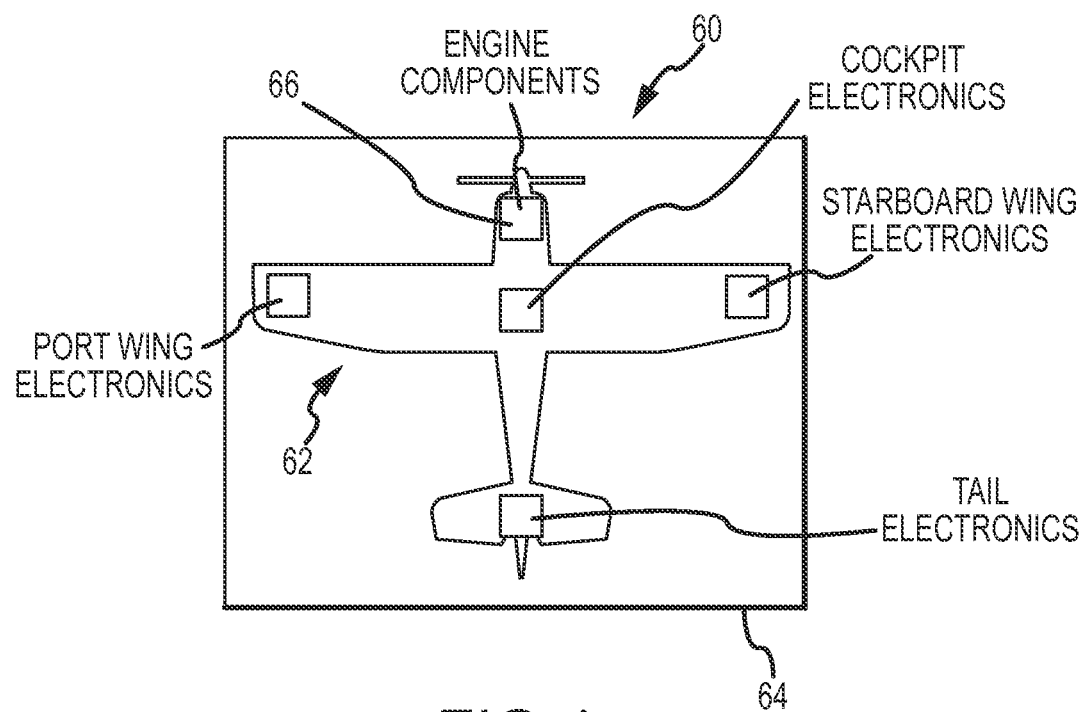
FIG. 4 is a diagram of an embodiment of the inset view illustrating the relationship of the various heat maps and highlighting a focus heat map prominently displayed in the carousel.

Referring now to FIG. 4, an embodiment of an inset view 60 includes an icon 62 of a system (e.g. an icon of a small airplane) that is displayed in an inset panel 64. The inset view 60 also includes generic icons 66 (e.g. boxes) for each sub-system e.g. Engine Components, Port Wing Electronics, Cockpit Electronics, Starboard Wing Electronics and Tail Electronics in a set. Each icon 66 is registered to the icon 62 of the small aircraft at the location of the corresponding sub-system within the system. The icon 66 that corresponds to the same sub-system as the current focus image is highlighted. This provides the operator with a visual cue as to which sub-system heat map he or she is currently viewing. As the operator rotates the carousel to change the focus heat map, the highlighted icon 66 changes accordingly. As an additional feature, each of the icons 66 may be highlighted (entire icon or just the border) with the color corresponding to the worst-case state for any cell in the associated heat map. If the entire sub-system is "good", the icon color will indicate that. If any component in sub-system is "degraded" or "bad", the icon color will so indicate. This allows an operator to quickly identify any sub-systems with degraded or bad components to view their heat maps and drill down to the problem component.

Figure 5:
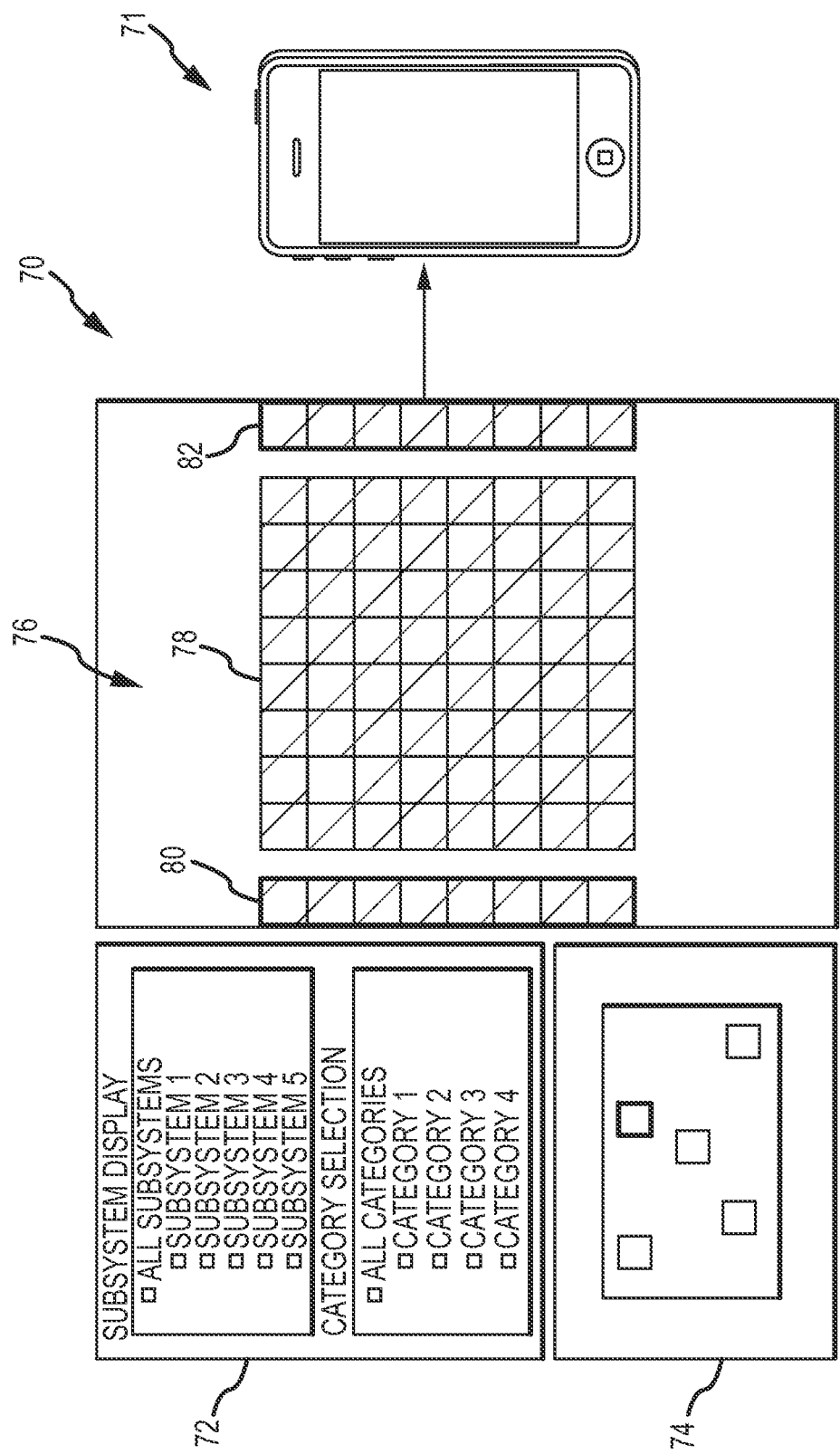
FIG. 5 is a diagram of an embodiment of a heat map carousel on a hand-held display.

Referring now to FIG. 5, an embodiment of a graphical interface 70 for a heat map carousel for a hand-held device 71 such as a smart phone or mini-tablet includes operator selectable filters 72, an inset view 74 of the system and sub-systems and a carousel view 76 in which the heat maps on either side of a focus heat map 78 in the ordered list are displayed as single-column borders 80 and 82 to either side of the focus heat map 78. The worst-case health and status is rolled up across the row of the heat map to determine the color of the single-column border. For example, if the entire heat map to the left of focus heat map 78 is green, the single-column border 80 will be all green. If the heat map to the right of focus heat map 78 is green except that the cell in row 3, column 5 is yellow and the cell in row 6, col 2 is red, the single-column border 80 will be green except that row 3 will be yellow and row 6 will be red. The "rolled up borders" allow for the benefits of a carousel view to be largely captured in the small form factor of a hand-held device without shrinking the display of the focus heat map.

Figure 6A:
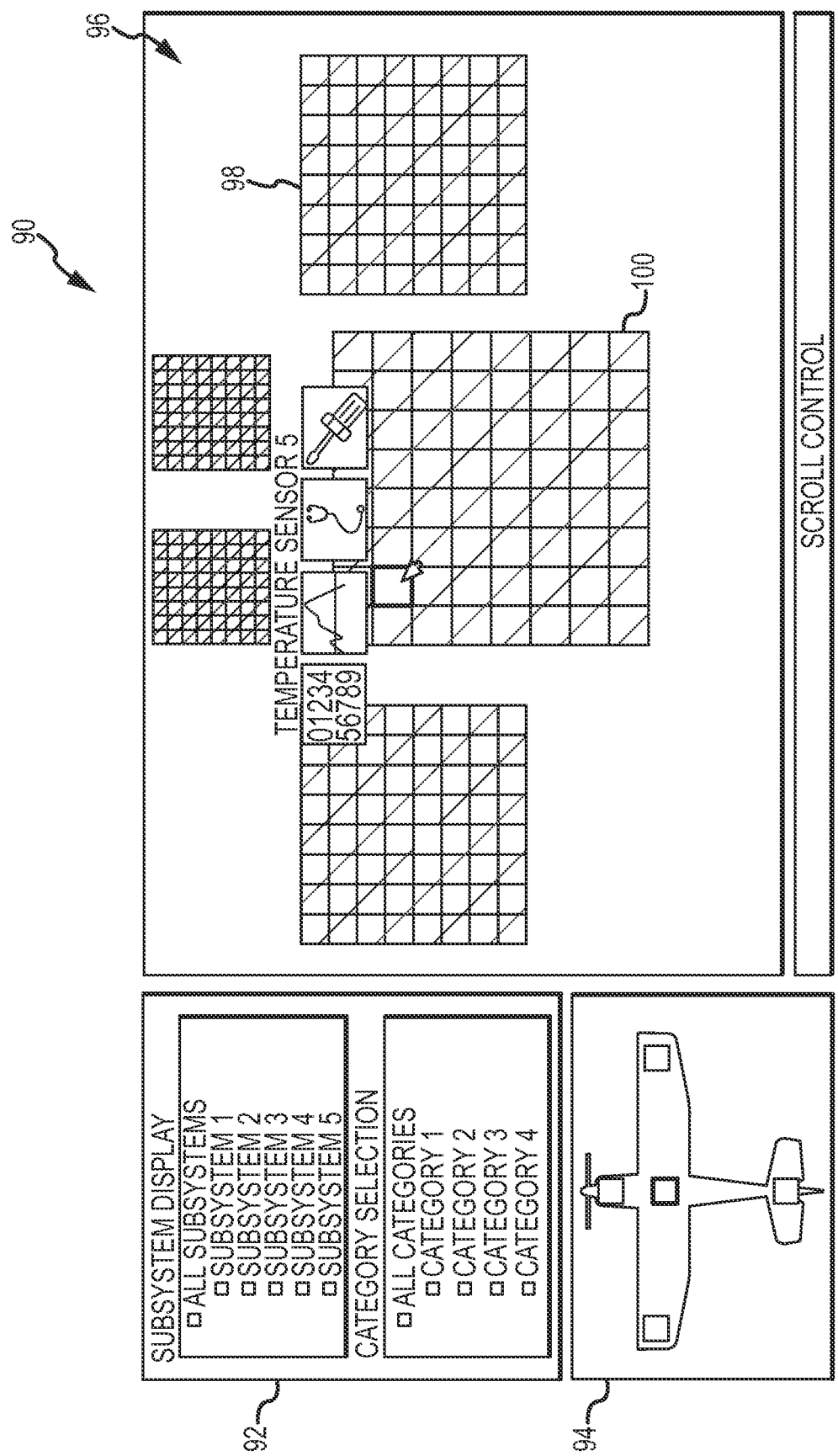
FIGS. 6a and 6b are diagrams of embodiments of the heat map carousel for different systems.
Figure 6B:
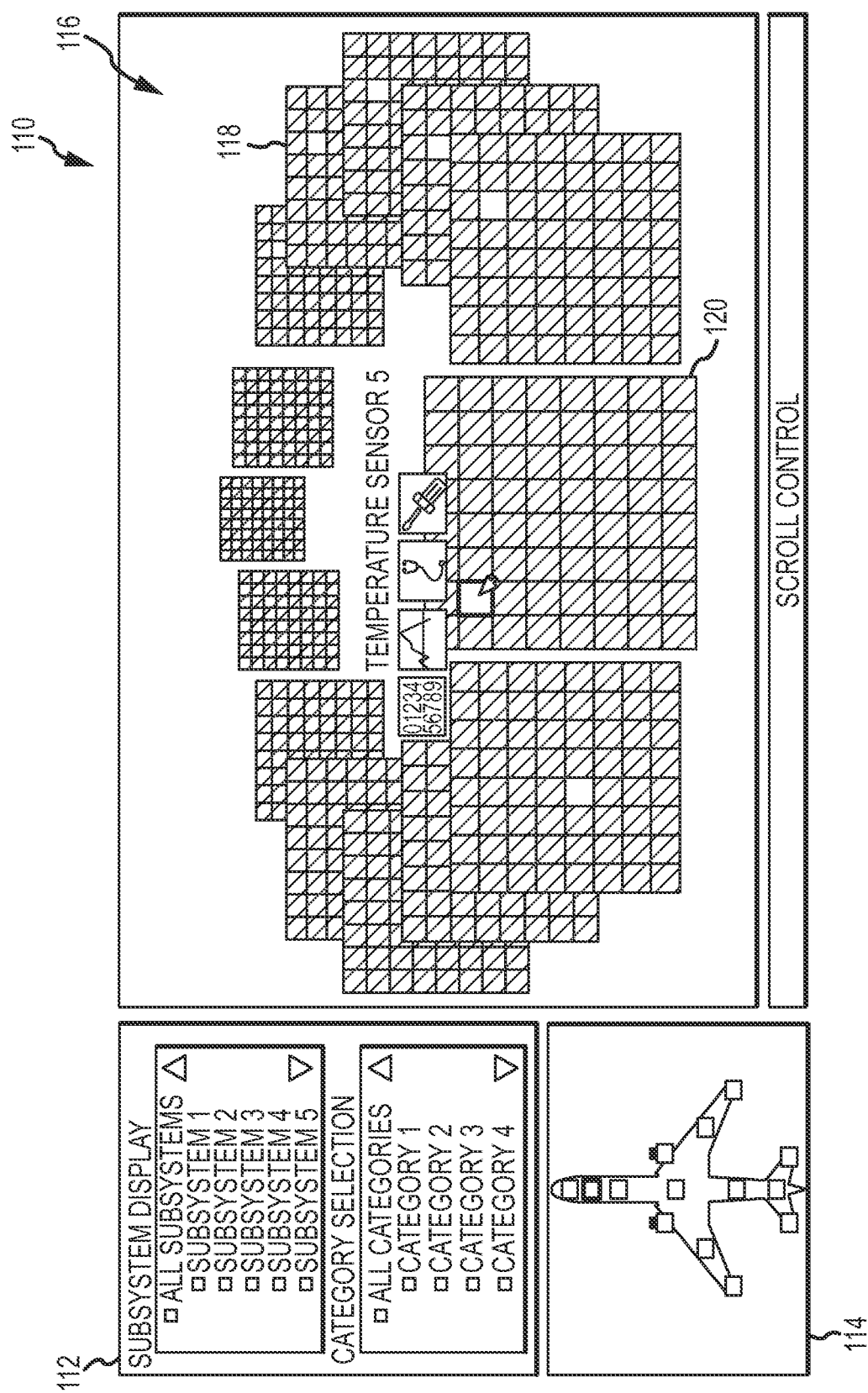

Referring now to FIGS. 6a and 6b, an embodiment of a graphical interface 90 (110) for a heat map carousel includes operator selectable filters 92 (112), an inset view 94 (114) of the system and sub-systems and a carousel view 96 (116) in which all of heat maps 98 (118) in the set are displayed in a three-dimensional perspective view with the focus heat map 100 (120) displayed more prominently (e.g. centrally and larger) than the other heat maps 98 (118). The three-dimensional perspective view requires more area to display all of the heat maps 98 (118) but more effectively exploits the combination of the heat map and carousel. The different figures show a set of all primary electronics sub-systems, one for a small aircraft having only 5 sub-systems and one for a large aircraft having 14 sub-systems. Even though the number of sub-systems, hence number of heat maps, almost tripled, all of the heat maps for the larger aircraft can be rendered effectively in the same display area. An operator can very quickly identify "bad" or "degraded" cells, hence hardware components, anywhere in the set, and can quickly rotate the carousel to display that heat map as the focus heat map, and "mouse over" the cell to identify the instance of the bad hardware component and the attribute that is degraded or bad. The heat map carousel provides an operator the ability to efficiently render and navigate through a large volume of health and status information.

Figure 7:
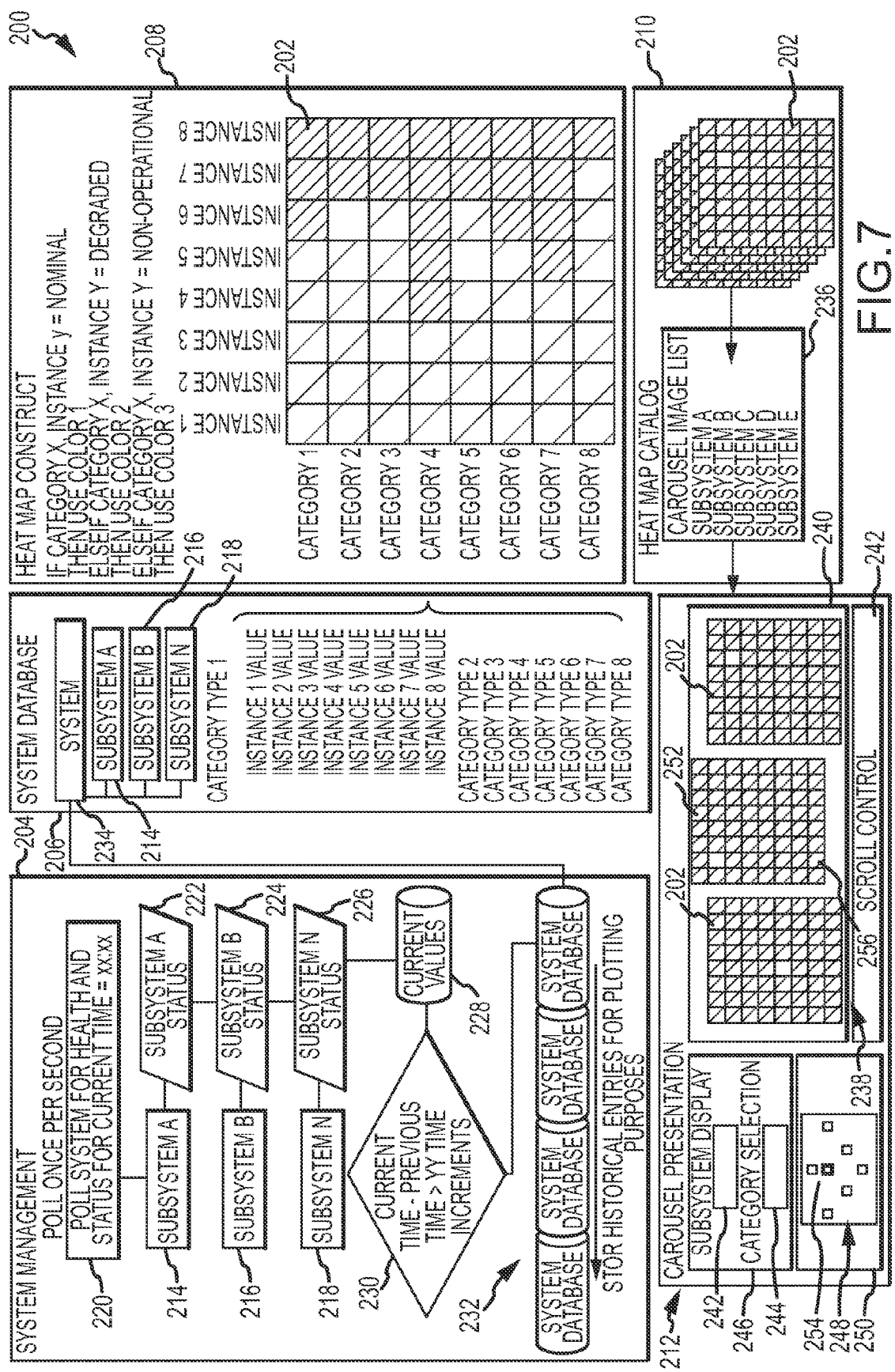
FIG. 7 is a diagram of an embodiment of the various software modules for implementing a heat map carousel in which the heat maps are displayed by category and instance.
Figure 8:
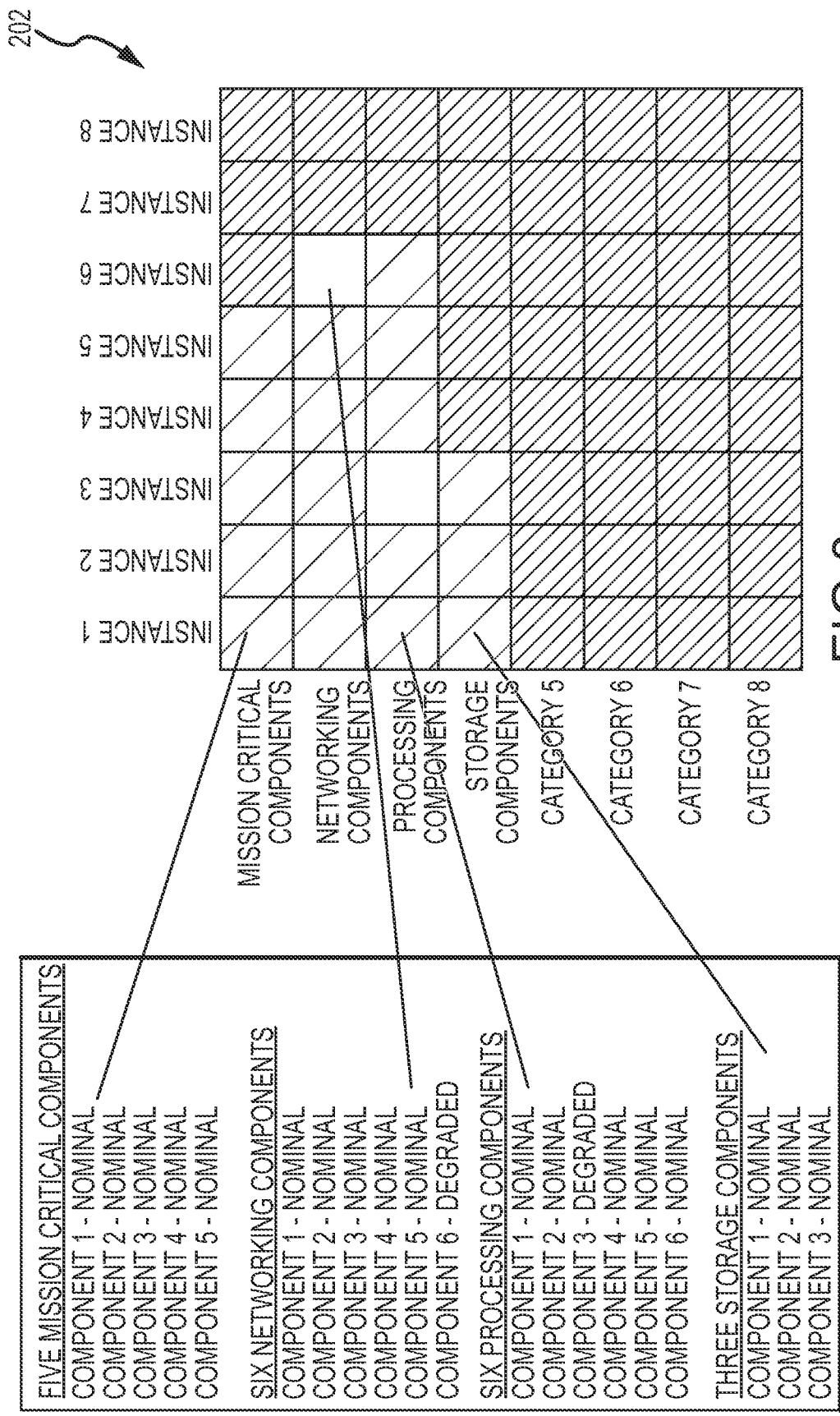
FIG. 8 is a diagram of an embodiment of a heat map displayed by category and instance.

FIGS. 7 and 8 illustrate an embodiment of the various software modules executed by the processing resources for implementing a heat map carousel 200 in which the heat maps 202 are rendered by category/sub-category and instance. Each row is a different category or sub-category and each column is a different instance. In this example, each instance has a single attribute whose value is "nominal", "degraded" or "non-operational", in the case where a cell is empty, there is no instance mapped to that cell. Nominal may, for example, be mapped to green, degraded to yellow and non-operational to red, and no instance/empty cells mapped to gray.

Heat map carousel 200 may be implemented by software modules including System Management 204, System Database 206, Heat Map Construct 208, Heat Map Catalog 210 and Carousel Presentation 212. Different combinations of software modules could be configured to implement the same or similar heat map carousel.

System Management Module 204 implements filters 242 and 244 to define the individual subsystems Sub-System A 214, Sub-System B 216 . . . Sub-System N 218 in a set. Module 204 polls (220) the system for health and status information e.g. once per second to generate Sub-System A status 222, Sub-System B status 224, . . . Sub-System N status 226, which together provide Current Values 228 for the attribute values for the instances of hardware components in each sub-system. The Current Values 228 are provided to System Database Module 206. The Current Values 228 may be downsampled to a longer time increment (230) and stored in System Database Module 206 to save a historical record 232 of the attribute values. In one embodiment, Module 204 only polls and stores attribute values for instances that are included in the set of sub-systems. In another embodiment, Module 204 polls and stores attributes for all instances in the entire system.

System Database Module 206 stores the attribute values for the current time, and likely a historical record back for a certain period of time, for a system (or set) 234 including each attribute for each instance of a category or sub-category within Sub-System A 214, Sub-System B 216 . . . Sub-System N 218.

Heat Map Construct 208 constructs a categorical heat map 202 for each Sub-System A, B, . . . N. For each row (category) and column (instance) in the heat map, if category x, instance y has a nominal attribute value the color 1 (e.g. green) is mapped to the cell. Else if category x, instance y has a degraded attribute value the color 2 (e.g. yellow) is mapped to the cell. Else if category x, instance y has a non-operational attribute value the color 3 (e.g. red) is mapped to the cell. By default, a cell is colored gray if no category x, instance y is mapped to that cell.

Heat Map Catalog 210 assigns each heat map 202 to a different bin in a carousel data structure in which the bins, hence heat maps, are linked in an ordered list 236 (e.g. a strip or continuous ring).

Carousel Presentation Module 212 renders the heat maps 202 in a carousel view 238 in a carousel display panel 240, renders a scroll control 242 for rotating the carousel view, renders subsystem display and category selection filters 242 and 244 in a side panel 246 and renders an inset view 248 in a side panel 250. Module 212 renders one of the heat maps 202 as a focus heat map 252. Module 212 highlights an icon 254 in inset view 248 corresponding to the sub-system represented in focus heat map 252. Module 212 may also roll up the "worst-case" state of the health and status information for each heat map to color the corresponding icons in the set view 248. As an operator uses scroll control 242, or selects an adjacent heat map or icon from the inset view, Module 212 rotates the ordered list to rotate the carousel view 238 of the heat maps 202 and change the focus heat map 252. As an operator mouses over or otherwise selects a cell 256 in the focus heat map 252, Module 212 displays health and status information for that cell.

Figure 9:
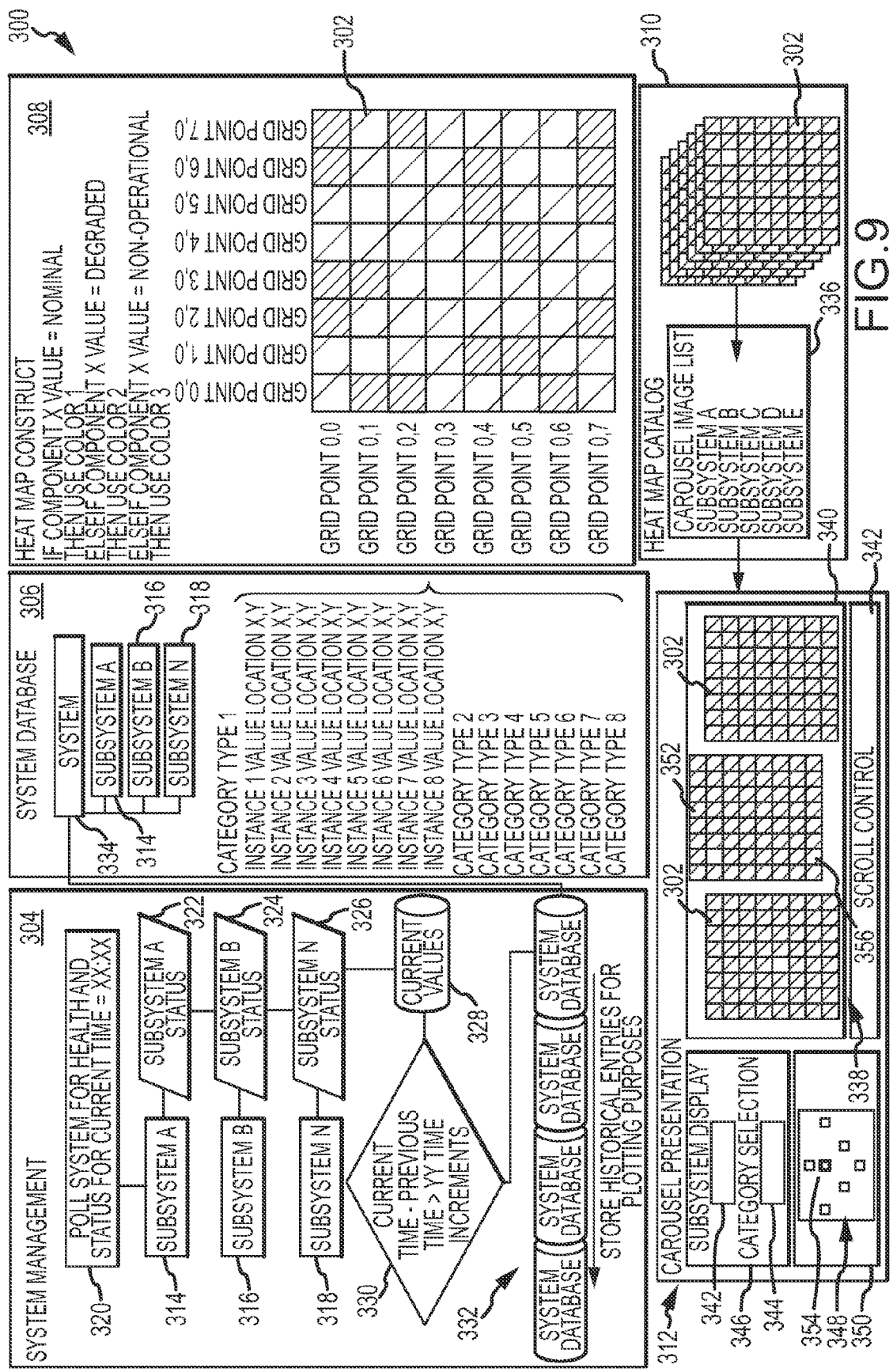
FIG. 9 is a diagram of an embodiment of the various software modules for implementing a heat map carousel in which the heat maps are displayed according to the spatial location of each instance.
Figure 10:
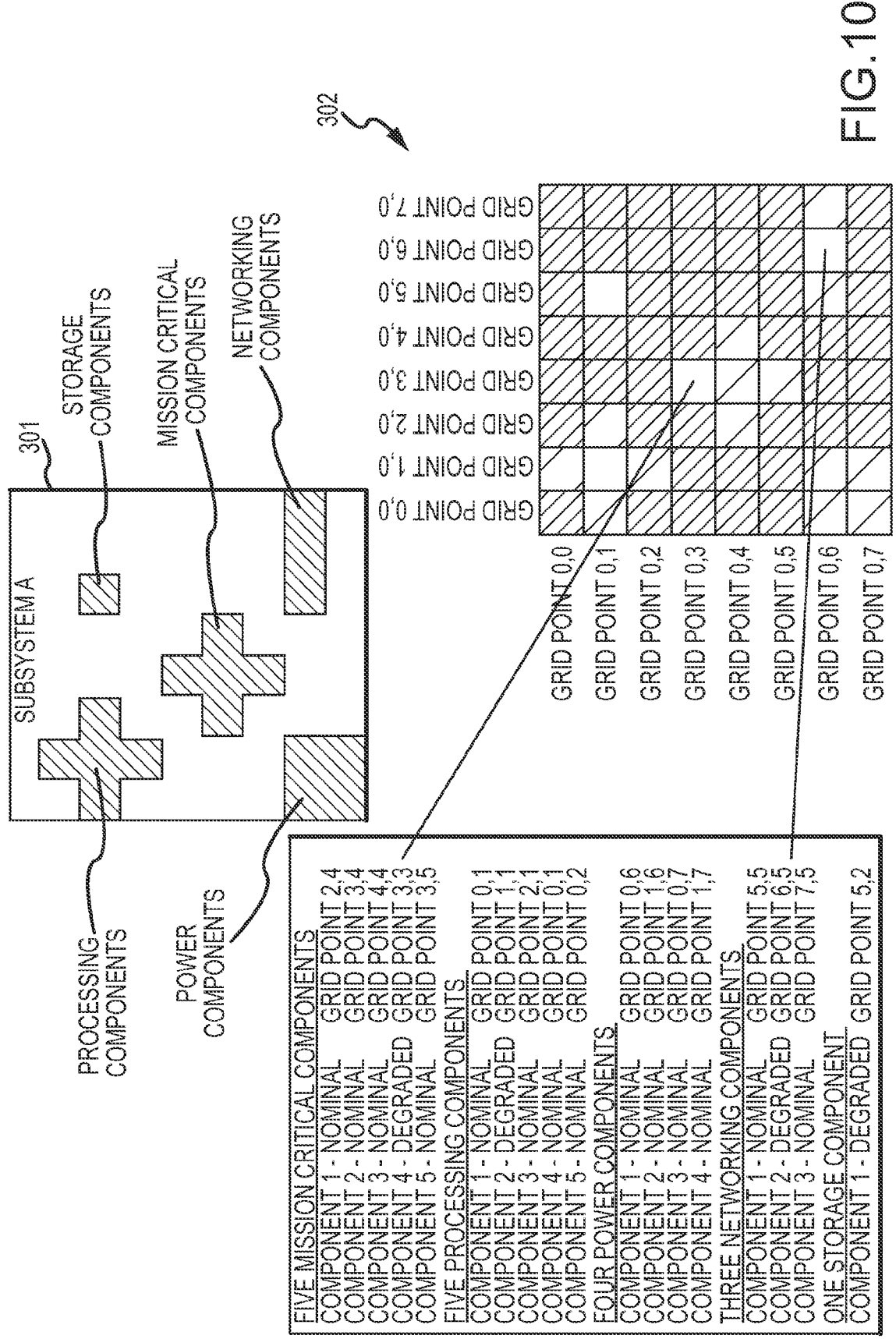
FIG. 10 is a diagram of an embodiment of a heat map displayed by the spatial location of each instance.

FIGS. 9 and 10 illustrate an embodiment of the various software modules executed by the processing resources for implementing a heat map carousel in which the heat maps 302 are rendered by location on x,y grid points. Each row and column is a different location or grip point in the area covered by the heat map. In this example, each instance has a single attribute whose value is "nominal", "degraded" or "non-operational", in the case where a cell is empty, there is no instance mapped to that cell. Nominal may, for example, be mapped to green, degraded to yellow and non-operational to red, and no instance/empty cells mapped to gray. The software modules of FIGS. 9 and 10 are similar to those of FIGS. 7 and 8 except that the format of the heat map 302 and the mapping of instances to the heat map 302 are based on the location identifier rather than the category/sub-category and instance identifiers. As shown in FIG. 11, spatial heat map 302 maps to a physical layout 301 of each sub-system. The physical layout of the various hardware components (processing, storage, mission critical, networking and power components) in sub-system A is shown for purposes of illustration Heat map carousel 300 may be implemented by software modules including System Management 304, System Database 306, Heat Map Construct 308, Heat Map Catalog 310 and Carousel Presentation 312. Different combinations of software modules could be configured to implement the same or similar heat map carousel.

System Management Module 304 implements filters 342 and 344 to define the individual subsystems Sub-System A 314, Sub-System B 316 . . . Sub-System N 318 in a set. Module 304 polls (220) the system for health and status information e.g. once per second to generate Sub-System A status 322, Sub-System B status 324, . . . Sub-System N status 326, which together provide Current Values 328 for the attribute values for the instances of hardware components in each sub-system. The Current Values 328 are provided to System Database Module 306. The Current Values 328 may be downsampled to a longer time increment (330) and stored in System Database Module 306 to save a historical record 332 of the attribute values. In one embodiment, Module 304 only polls and stores attribute values for instances that are included in the set of sub-systems. In another embodiment, Module 304 polls and stores attributes for all instances in the entire system.

System Database Module 306 stores the attribute values for the current time, and likely a historical record back for a certain period of time, for a system (or set) 334 including each attribute for each instance of a category or sub-category within Sub-System A 314, Sub-System B 316 . . . Sub-System N 318.

Heat Map Construct 308 constructs a categorical heat map 302 for each Sub-System A, B, . . . N. For each row (category) and column (instance) in the heat map, if category x, instance y has a nominal attribute value the color 1 (e.g. green) is mapped to the cell. Else if category x, instance y has a degraded attribute value the color 2 (e.g. yellow) is mapped to the cell. Else if category x, instance y has a non-operational attribute value the color 3 (e.g. red) is mapped to the cell. By default, a cell is colored gray if no category x, instance y is mapped to that cell.

Heat Map Catalog 310 assigns each heat map 302 to a different bin in a carousel data structure in which the bins, hence heat maps, are linked in an ordered list 336 (e.g. a strip or continuous ring).

Carousel Presentation Module 312 renders the heat maps 302 in a carousel view 338 in a carousel display panel 340, renders a scroll control 342 for rotating the carousel view, renders subsystem display and category selection filters 342 and 344 in a side panel 346 and renders an inset view 348 in a side panel 350. Module 312 renders one of the heat maps 302 as a focus heat map 352. Module 312 highlights an icon 354 in inset view 348 corresponding to the sub-system represented in focus heat map 352. Module 312 may also roll up the "worst-case" state of the health and status information for each heat map to color the corresponding icons in the set view 348. As an operator uses scroll control 342, or selects an adjacent heat map or icon from the inset view, Module 312 rotates the ordered list to rotate the carousel view 338 of the heat maps 302 and change the focus heat map 352. As an operator mouses over or otherwise selects a cell 356 in the focus heat map 354, Module 312 displays health and status information for that cell.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of displaying health and status information for an electro-mechanical system in a carousel view on a display, said method comprising:
    defining a set including a plurality of sub-systems, each sub-system including one or more instances of hardware components from one or more categories and sub-categories, each instance characterized by one or more identifiers and one or more health and status attributes, each said attribute having an assigned value indicative of the health and status of the instance;
    polling the system for health and status information to update the attribute values for each instance of each sub-system in the set;
    defining a heat map having rows and columns of cells;
    for each sub-system in the set, mapping the one or more instances of hardware components from the one or more categories and sub-categories to different cells in the heat map based either on the category and sub-category designation of the instance or on a location of the instance within a physical area of the sub-system and mapping the attribute values for the one or more instances to a color to color the cells of the heat map and provide a different heat map for each sub-system, each said color indicative of a different state of the health and status of an instance;
    assigning each heat map to a different bin in a carousel data structure, said bins and heat maps being linked in an ordered list;
    displaying at least one of the heat maps in the ordered list in a carousel display panel on the display, one said heat map displayed as a focus heat map;

displaying an inset view of the system with a spatial layout of the sub-systems in the set adjacent to the carousel display panel, each said sub-system displayed as an icon;

highlighting the sub-system icon in the inset view that corresponds to the focus heat map to provide a visual cue for the focus heat map;

in response to an operator input, rotating the carousel to display a different heat map as the focus heat map in the carousel display panel and to highlight a different sub-system icon in the inset view that corresponds to the new focus heat map; and in response to an operator selection of a cell in the focus heat map, displaying health and status information for the selected cell on the display.

2. The method of claim 1, wherein defining the set comprises applying one or more set filters that filter the instances in the system based on the instance identifiers to select the sub-systems and set sub-systems.

3. The method of claim 1, wherein each said instance includes at least a category and sub-category identifier, wherein defining the sub-systems in the set comprises applying one or more sub-system filters that filter the instances based on category and sub-category.

4. The method of claim 1, wherein each said instance includes at least a location identifier, wherein defining the sub-systems in the set comprises applying one or more sub-system filters that filter the instances based on location.

5. The method of claim 1, wherein each said instance includes at least a category, sub-category and instance identifier, wherein defining the heat map comprises allocating rows of cells for the hardware component categories and sub-categories in the set and columns of cells for the instances of each hardware component, wherein mapping the instances to the cells in the heat map comprises mapping each instance to the row and column in the heat map corresponding to its category and subcategory and instance identifier.

6. The method of claim 1, wherein each said instance includes at least a location identifier, wherein defining the heat map comprises allocating rows of cells and columns of cells that cover a physical area in the sub-system, wherein mapping the instances to the cells in the heat map comprises mapping each instance to the row and column in the heat map corresponding to the location identifier.

7. The method of claim 1, wherein if no instance is mapped to a cell in the heat map or if an instance mapped to a cell does not have an attribute value, mapping a default color to that cell to denote no value for that cell.

8. The method of claim 1, wherein the ordered list of said bins and heat maps is ordered as either a continuous ring or a strip.

9. The method of claim 1, wherein the focus heat map is centrally displayed in the carousel display panel and more prominently displayed than other displayed heat maps.

10. The method of claim 1, wherein the display comprises a hand-held display, further comprising:

displaying the heat maps immediately before and immediately after the focus heat map in the ordered list as first and second single-column borders to either side of the focus heat map in the carousel display panel, each cell in the first single-column border mapped to the color corresponding to the worst-case state in the corresponding row of the heat map immediately before the focus heat map, each cell in the second single-column border mapped to the color corresponding to the worst-case state in the corresponding row of the heat map immediately after the focus heat map.

11. The method of claim 1, further comprising displaying the heat maps on either side of the focus heat map in the ordered list on either side of the focus heat map in the carousel display panel.

12. The method of claim 1, wherein the ordered list of said bins and heat maps is ordered as a continuous ring, further comprising displaying all of the heat maps in the ordered list as a three-dimensional perspective view of the continuous ring with said focus heat map centrally and more prominently displayed than all other heat maps in the continuous ring.

13. The method of claim 1, wherein the displayed health and status information for the selected cell comprises at least an identifier of the instance and the attribute that mapped to the cell color.

14. The method of claim 13, wherein the displayed health and status information further comprises one or more links to raw data for the one or more attribute values, a historical record of the one or more attribute values, and links to applicable diagnostics or service manuals.

15. The method of claim 1, wherein the system includes a hierarchy of at least two levels in which the set is a first level and at least one said sub-system constitutes a set at a second level that itself includes a plurality of sub-systems with each sub-system assigned a different heat map with the heat maps linked in an ordered list, further comprising selecting the set at the first or second level to display at least one of the heat maps in the ordered list at the first or second level in the carousel display panel as the focus heat map.

* * * * *